(12) United States Patent
Takeuchi et al.

(10) Patent No.: US 10,342,071 B2
(45) Date of Patent: *Jul. 2, 2019

(54) COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD EXECUTED BY COMMUNICATION DEVICE

(71) Applicant: Brother Kogyo Kabushiki Kaisha, Nagoya-shi, Aichi (JP)

(72) Inventors: Shun Takeuchi, Kiyosu (JP); Hirotaka Asakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/871,562

(22) Filed: Jan. 15, 2018

(65) Prior Publication Data

US 2018/0206291 A1    Jul. 19, 2018

(30) Foreign Application Priority Data

Jan. 16, 2017 (JP) .................................. 2017-004960

(51) Int. Cl.
*H04B 5/00*    (2006.01)
*H04W 4/80*    (2018.01)
(Continued)

(52) U.S. Cl.
CPC ........... *H04W 88/06* (2013.01); *H04W 76/15* (2018.02); *H04W 4/80* (2018.02); *H04W 76/10* (2018.02); *H04W 84/12* (2013.01); *H04W 84/20* (2013.01)

(58) Field of Classification Search
CPC ...................................................... H04W 4/80
See application file for complete search history.

(56) References Cited

U.S. PATENT DOCUMENTS

| 8,848,228 | B2 * | 9/2014 | Park ....................... G06F 3/1296 |
| | | | 358/1.15 |
| 9,094,782 | B2 | 7/2015 | Asai |

(Continued)

FOREIGN PATENT DOCUMENTS

| JP | 2013214803 A | 10/2013 |
| JP | 2014127819 A | 7/2014 |
| JP | 2014220700 A | 11/2014 |

OTHER PUBLICATIONS

Wi-Fi Alliance, "Wi-Fi Peer-to Peer (P2P) Technical Specification", Version 1.5, pp. 1-183, 2014.

(Continued)

*Primary Examiner* — Cindy Trandai
(74) *Attorney, Agent, or Firm* — Banner & Witcoff, Ltd.

(57) ABSTRACT

A communication device may shift an operation state of the communication device from a child station state to a specific state, in a case where a first wireless connection with a second external device is established via a second wireless interface under a predetermined state where the communication device is participating, as a child station, in a first wireless network in which a first external device is a parent station. The communication device may receive a request signal from the second external device via a first wireless interface after the operation state has been shifted to the specific state, and in a case where the request signal is received from the second external device, establish a second wireless connection with the second external device via the first wireless interface so as to belong to a second wireless network for executing a wireless communication via the first wireless interface.

14 Claims, 9 Drawing Sheets

(51) Int. Cl.
*H04W 88/06* (2009.01)
*H04W 76/15* (2018.01)
*H04W 84/12* (2009.01)
*H04W 76/10* (2018.01)
*H04W 84/20* (2009.01)

(56) References Cited

U.S. PATENT DOCUMENTS

| | | | |
|---|---|---|---|
| 2006/0101280 A1* | 5/2006 | Sakai | G06F 21/35 |
| | | | 713/184 |
| 2011/0085529 A1* | 4/2011 | Choi | H04W 76/023 |
| | | | 370/338 |
| 2011/0225305 A1* | 9/2011 | Vedantham | G06F 1/3203 |
| | | | 709/227 |
| 2012/0099566 A1* | 4/2012 | Laine | H04M 1/7253 |
| | | | 370/338 |
| 2012/0134349 A1* | 5/2012 | Jung | H04W 8/005 |
| | | | 370/338 |
| 2012/0173620 A1* | 7/2012 | Holostov | H04L 67/1048 |
| | | | 709/204 |
| 2012/0224569 A1* | 9/2012 | Kubota | H04W 84/20 |
| | | | 370/338 |
| 2012/0265913 A1* | 10/2012 | Suumaki | H04W 4/08 |
| | | | 710/303 |
| 2012/0278389 A1* | 11/2012 | Thangadorai | H04W 84/20 |
| | | | 709/204 |
| 2012/0317199 A1* | 12/2012 | Nam | H04L 67/1044 |
| | | | 709/204 |
| 2013/0045678 A1* | 2/2013 | Lee | H04W 4/08 |
| | | | 455/39 |
| 2013/0128311 A1* | 5/2013 | Kim | G06F 3/1296 |
| | | | 358/1.15 |
| 2013/0194962 A1* | 8/2013 | Abraham | H04W 8/005 |
| | | | 370/254 |
| 2013/0217324 A1* | 8/2013 | Lee | H04M 1/7253 |
| | | | 455/41.1 |
| 2013/0250354 A1* | 9/2013 | Kato | H04N 1/00225 |
| | | | 358/1.15 |
| 2013/0258390 A1* | 10/2013 | Suzuki | H04N 1/00912 |
| | | | 358/1.14 |
| 2013/0260682 A1* | 10/2013 | Suzuki | H04W 88/06 |
| | | | 455/41.1 |
| 2013/0260818 A1 | 10/2013 | Suzuki et al. | |
| 2014/0091987 A1* | 4/2014 | Lee | H04L 65/00 |
| | | | 345/2.3 |
| 2014/0176981 A1 | 6/2014 | Asai | |
| 2014/0320908 A1* | 10/2014 | Iwauchi | H04L 45/24 |
| | | | 358/1.15 |
| 2015/0092231 A1 | 4/2015 | Shibata | |
| 2015/0117340 A1* | 4/2015 | Kawakami | H04W 76/14 |
| | | | 370/329 |
| 2015/0195686 A1* | 7/2015 | Yu | H04W 4/08 |
| | | | 370/338 |
| 2015/0249946 A1* | 9/2015 | Oh | H04W 36/14 |
| | | | 370/331 |
| 2015/0373763 A1 | 12/2015 | Ren et al. | |
| 2016/0165384 A1* | 6/2016 | Amano | H04W 4/80 |
| | | | 455/41.1 |
| 2016/0316511 A1 | 10/2016 | Suzuki et al. | |
| 2018/0069761 A1* | 3/2018 | Iwami | G06F 13/00 |

OTHER PUBLICATIONS

Oct. 5, 2018—U.S. Non-Final Office Action—U.S. Appl. No. 15/887,167.

* cited by examiner

FIG. 1
Communication System 2
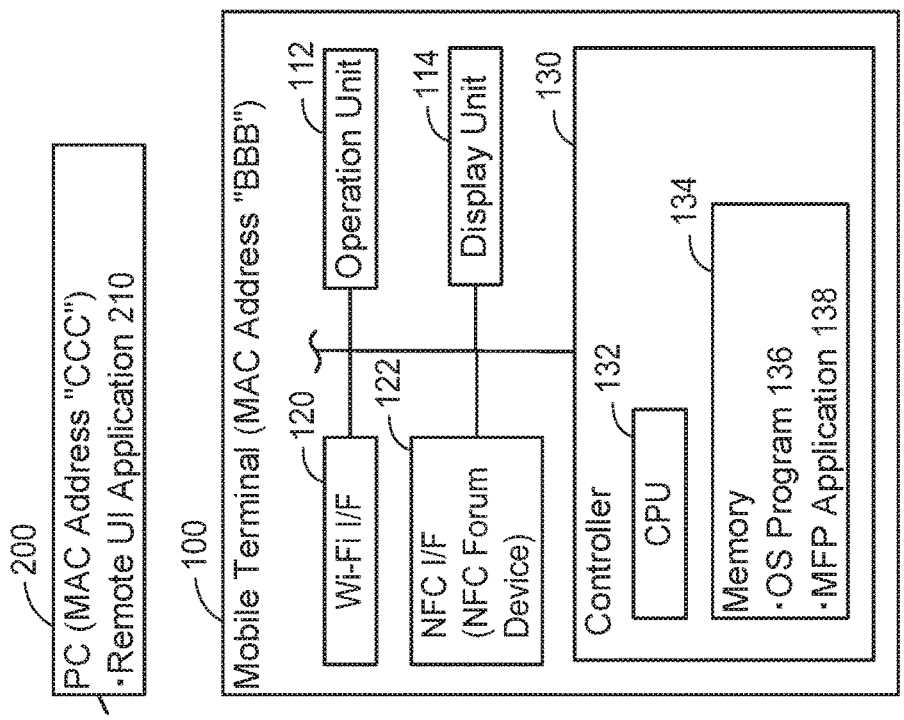
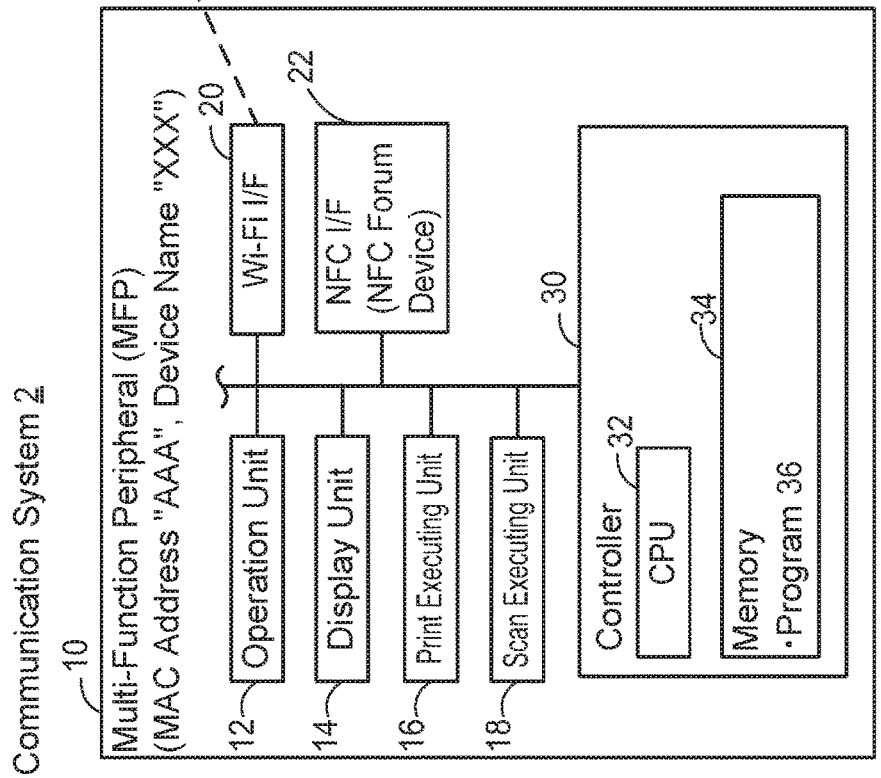

COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD EXECUTED BY COMMUNICATION DEVICE

TECHNICAL FIELD

The disclosure herein discloses a technique for causing a communication device and an external device to belong to a same wireless network.

BACKGROUND ART

A technique is widely known in which a communication device participates as a child station in a wireless network in which an external device is a parent station, and executes a wireless communication with the external device by using the wireless network.

SUMMARY

In a state where a communication device is participating as a child station in a wireless network in which a first external device is a parent station, the communication device usually cannot belong to another wireless network.

The disclosure herein discloses a communication device that is capable of belonging to a second wireless network instead of a state where the communication device is participating as a child station in a first wireless network in which a first external device is a parent station.

A communication device disclosed herein may comprise: a first wireless interface; a second wireless interface different from the first wireless interface, wherein a communication speed of a wireless communication via the second wireless interface is slower than a communication speed of a wireless communication via the first wireless interface; a processor, and a memory storing computer-readable instructions therein, the computer-readable instructions, when executed by the processor, causing the communication device to: shift an operation state of the communication device from a child station state for operating as a child station of a first wireless network to a specific state different from the child station state, in a case where a first wireless connection with a second external device is established via the second wireless interface under a predetermined state, the predetermined state being a state where the communication device is participating, as the child station, in the first wireless network in which a first external device different from the second external device is a parent station, the first wireless network being for executing a wireless communication via the first wireless interface; receive a request signal from the second external device via the first wireless interface after the operation state of the communication device has been shifted to the specific state, the request signal being for requesting the communication device to establish a wireless connection via the first wireless interface; and establish a second wireless connection with the second external device via the first wireless interface so as to belong to a second wireless network for executing a wireless communication via the first wireless interface in a case where the request signal is received from the second external device.

A control method, computer-readable instructions, and a non-transitory computer-readable recording medium storing the computer-readable instructions, for implementation of the aforementioned communication device are also novel and useful. Further, a communication system which comprises the aforementioned communication device and first and/or second external device(s) is also novel and useful.

BRIEF DESCRIPTION OF THE DRAWINGS

FIG. 1 shows a configuration of a communication system.

EMBODIMENTS

Figure 2:
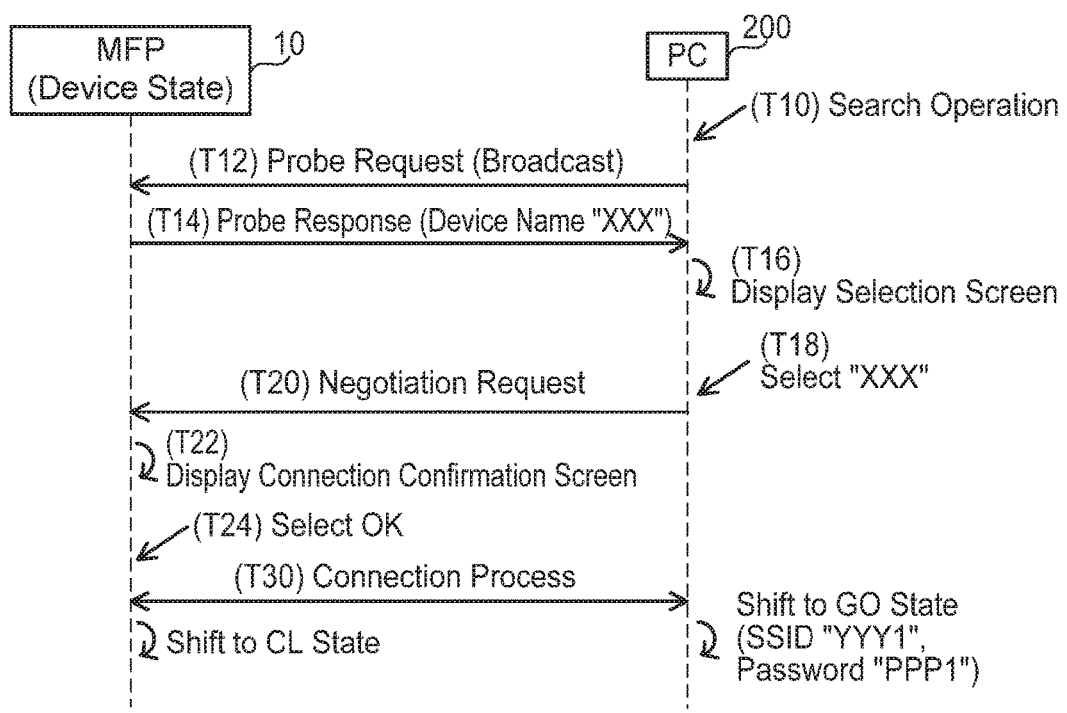
FIG. 2 shows a sequence diagram of an MFP shifting to CL state.

First Embodiment (Configuration of Communication System 2; FIG. 1)

As shown in FIG. 1, a communication system 2 comprises a multi-function peripheral 10 (called "MFP" below) and a mobile terminal 100. The MFP 10 and the mobile terminal 100 are capable of mutually executing a Wi-Fi communication, which is a wireless communication according to Wi-Fi scheme, and mutually executing an NFC (abbreviation of Near Field Communication) communication, which is a wireless communication according to NFC scheme.

(Configuration of MFP 10)

The MFP 10 is a peripheral device (e.g., a peripheral device of a PC 200, etc.) capable of executing multiple functions including a print function and a scan function. A MAC address "AAA" and a device name "XXX" are allocated to the MFP 10. The MFP 10 comprises an operation unit 12, a display unit 14, a print executing unit 16, a scan executing unit 18, a Wi-Fi interface (interface is denoted as "I/F" below) 20, an NFC I/F 22, and a controller 30.

The operation unit 12 comprises a plurality of keys. A user can input various instructions to the MFP 10 by operating the operation unit 12. The display unit 14 is a display for displaying various information. The display unit 14 also functions as a so-called touch panel. That is, the display unit 14 also functions as an operation unit. Below, the operation unit 12 and the display unit 14 may collectively be referred to as "MFP operation unit". The print executing unit 16 is a printing mechanism such as an ink jet scheme, laser scheme, etc. The scan executing unit 18 is a scanning mechanism such as CCD, CIS, etc.

The Wi-Fi I/F 20 is an I/F for executing a Wi-Fi communication according to the Wi-Fi scheme. The Wi-Fi scheme is a wireless communication scheme based on, for example, the standard of IEEE (abbreviation of The Institute of Electrical and Electronics Engineers, Inc.) 802.11 and standards conforming thereto (e.g., 802.11a, 11b, 11g, 11n, etc.). The Wi-Fi I/F 20 supports, in particular, WFD (abbreviation of Wi-Fi Direct (registered trademark)) scheme developed by the Wi-Fi Alliance. The WFD scheme is a wireless communication scheme described in the standard document "Wi-Fi Peer-to-Peer (P2P) Technical Specification Version 1.5" created by the Wi-Fi Alliance.

The MFP 10 is capable of operating in any of Group Owner state, Client state, and device state of the WFD scheme. Below, Group Owner and Client will be referred to as "G/O" and "CL", respectively. In a case where the MFP 10 operates in the G/O state, the MFP 10 forms a WFD network (referred to as "WFDNW" below) in which the MFP 10 operates as a parent station (i.e., G/O). In that case, the MFP 10 can establish a Wi-Fi connection with an external device, and cause the external device to participate in the WFDNW as a child station. For example, in a case where the external device is a device supporting the WFD scheme (called "WFD device" below), the external device operates in the CL state, and participates in the WFDNW as a child station (i.e., CL). When an upper limit of a number of child stations capable of participating in the WFDNW in which the MFP 10 operates as the parent station is two or more, in a state where one external device is participating in the WFDNW as the child station, the MFP 10 can further establish a Wi-Fi connection with another external device, and cause the other external device to participate in the WFDNW as a child station. Further, in a case where the external device operates in the G/O state, the MFP 10 operates in the CL state. In that case, the MFP 10 can establish a Wi-Fi connection with the external device, and participate as a child station (i.e., CL) in a WFDNW formed by the external device. In the state where the MFP 10 is participating as the child station in the WFDNW formed by the external device, the MFP 10 cannot further establish a Wi-Fi connection with another external device. It should be noted that the device state is a state which is neither the G/O state or the CL state, that is, a state in which the MFP 10 is not establishing a connection with an external device.

Further, the Wi-Fi I/F 20 supports WPS (abbreviation of Wi-Fi Protected Setup) formulated by the Wi-Fi Alliance. The WPS is a so-called automatic wireless setting or easy wireless setting, and is a technology capable of easily establishing a wireless connection according to the Wi-Fi scheme (called "Wi-Fi connection" below) between a pair of devices without a user inputting wireless setting information (e.g., password, authentication scheme, encryption scheme, etc.) for establishing the Wi-Fi connection. In particular, the Wi-Fi I/F 20 supports PBC (abbreviation of Push Button Configuration) scheme of the WPS. The PBC scheme is a scheme for establishing a Wi-Fi connection between a pair of devices in a case where a user executes a wireless connection operation (e.g., an operation of pushing button) on each of the pair of devices.

The NFC I/F 22 is an I/F for executing an NFC communication according to the NFC (abbreviation of Near Field Communication) scheme. The NFC scheme is a wireless communication scheme based on international standards such as ISO/IEC14443, 15693, 18092. It should be noted that an I/F called an NFC forum device, and an I/F called an NFC forum tag are known as types of I/F for executing an NFC communication. The NFC I/F 22 is an NFC forum device, and is capable of selectively operating in any of P2P (abbreviation of Peer To Peer) mode, R/W (abbreviation of Reader/Writer) mode, and CE (abbreviation of Card Emulation) mode.

Next, differences between the Wi-Fi I/F 20 and the NFC I/F 22 will be described. A communication speed of a Wi-Fi communication via the Wi-Fi I/F 20 (e.g., maximum communication speed is 11 to 600 Mbps) is faster than a communication speed of an NFC communication via the NFC I/F 22 (e.g., maximum communication speed is 100 to 424 Kbps). Further, a frequency of a carrier wave in a Wi-Fi communication via the Wi-Fi I/F 20 (e.g. 2.4 GHz band or 5.0 GHz band) is different from a frequency of a carrier wave in an NFC communication via the NFC I/F 22 (e.g. 13.56 MHz band). Further, a maximum distance with which a Wi-Fi communication via the Wi-Fi I/F 20 can be executed (e.g., approximately 100 m at maximum) is greater than a maximum distance with which an NFC communication via the NFC I/F 22 can be executed (e.g., approximately 10 cm at maximum).

The controller 30 comprises a CPU 32 and a memory 34. The CPU 32 executes various processes in accordance with a program 36 stored in the memory 34. The memory 34 is constituted of a volatile memory, a non-volatile memory, etc.

(Configuration of Mobile Terminal 100)

The mobile terminal 100 is a portable terminal device such as a mobile telephone, a smartphone, a PDA, a notebook PC, a tablet PC, a portable music playback device or a portable movie playback device. A MAC address "BBB" is allocated to the mobile terminal 100. The mobile terminal 100 comprises an operation unit 112, a display unit 114, a Wi-Fi I/F 120, an NFC I/F 122, and a controller 130.

The operation unit 112 comprises a plurality of keys. The user can input various instructions to the mobile terminal 100 by operating the operation unit 112. The display unit 114 is a display for displaying various information. The display unit 114 also functions as a so-called touch panel. That is, the display unit 114 also functions as an operation unit. Below, the operation unit 112 and the display unit 114 may collectively be referred to as "terminal operation unit". The Wi-Fi I/F 120 and the NFC I/F 122 are the same as the Wi-Fi I/F 20 and the NFC I/F 22 of the MFP 10, respectively.

The controller 130 comprises a CPU 132 and a memory 134. The CPU 132 executes various processes in accordance with an OS (abbreviation of Operating System) program 136 stored in the memory 134. The OS program 136 is software for controlling various basic operations of the mobile terminal 100. Further, the memory 134 stores an MFP application 138. The MFP application 138 is an application provided by a vendor of the MFP 10, and is installed in the mobile terminal 100 from, for example, a server on the Internet. The MFP application 138 is an application for establishing a Wi-Fi connection between the mobile terminal 100 and the MFP 10, and executing a communication of target data (e.g., print data, scan data) by using the Wi-Fi connection between the mobile terminal 100 and the MFP 10.

In the present embodiment, further, the PC 200 is present around the MFP 10. The PC 200 is a WFD device. The PC 200 comprises a remote UI (abbreviation of User Interface) application 210. The UI application 210 is an application for executing, on the PC 200, the same operation as an operation executed on the MFP operation unit. When the UI application 210 is activated in a state where the PC 200 and the MFP 10 belong to a same WFDNW, the same screen as a screen displayed on the display unit 14 of the MFP 10 is displayed on the PC 200. In this state, when a button on the screen is operated, the PC 200 sends information indicating that the button has been operated to the MFP 10 by using the Wi-Fi connection. As a result, the MFP 10 executes a function allocated to that button.

(Establishment of Wi-Fi Connection Between MFP 10 and PC 200; FIG. 2)

Next, a manner by which a Wi-Fi connection between the MFP 10 and the PC 200 is established will be described with reference to FIG. 2. In an initial state of FIG. 2, the MFP 10 is operating in the device state.

When a search operation is executed on the PC 200 by the user in T10, the PC 200 sends a Probe request by broadcast in T12.

Upon receiving the Probe request from the PC 200 in T12, the MFP 10 sends a Probe response including the device name "XXX" to the PC 200 in T14.

Upon receiving the Probe response from the MFP 10 in T14, the PC 200 displays, in T16, a selection screen including the device name "XXX" included in the Probe response, and in T18, accepts selection of the device name "XXX". Then, in T20, the PC 200 sends a negotiation request to the MFP 10. The negotiation request is a signal for requesting execution of a communication called a G/O negotiation. The G/O negotiation is an operation determining communication for determining which of the MFP 10 and the PC 200 is to operate as a parent station (i.e., G/O).

Upon receiving the negotiation request from the PC 200 in T20, the MFP 10 displays a connection confirmation screen on the display unit 14 in T22. The connection confirmation screen is a screen for confirming to the user whether a Wi-Fi connection with the PC 200 is to be established. In T24, the MFP 10 accepts selection of an OK button on the connection confirmation screen.

In T30, the MFP 10 and the PC 200 execute a G/O negotiation. As a result, it is determined that the PC 200 operates as G/O. Therefore, the PC 200 shifts from the device state to the G/O state, and the MFP 10 shifts from the device state to the CL state.

The PC 200 generates first wireless setting information (i.e., SSID "YYY1", password "PPP1", etc.) to be used in a first WFDNW in which the PC 200 operates as the parent station (i.e., G/O), and sends the first wireless setting information to the MFP 10.

Upon receiving the first wireless setting information from the PC 200, the MFP 10 establishes a Wi-Fi connection with the PC 200 by using the first wireless setting information, and participates in the first WFDNW as a child station (i.e., CL).

Figure 3:
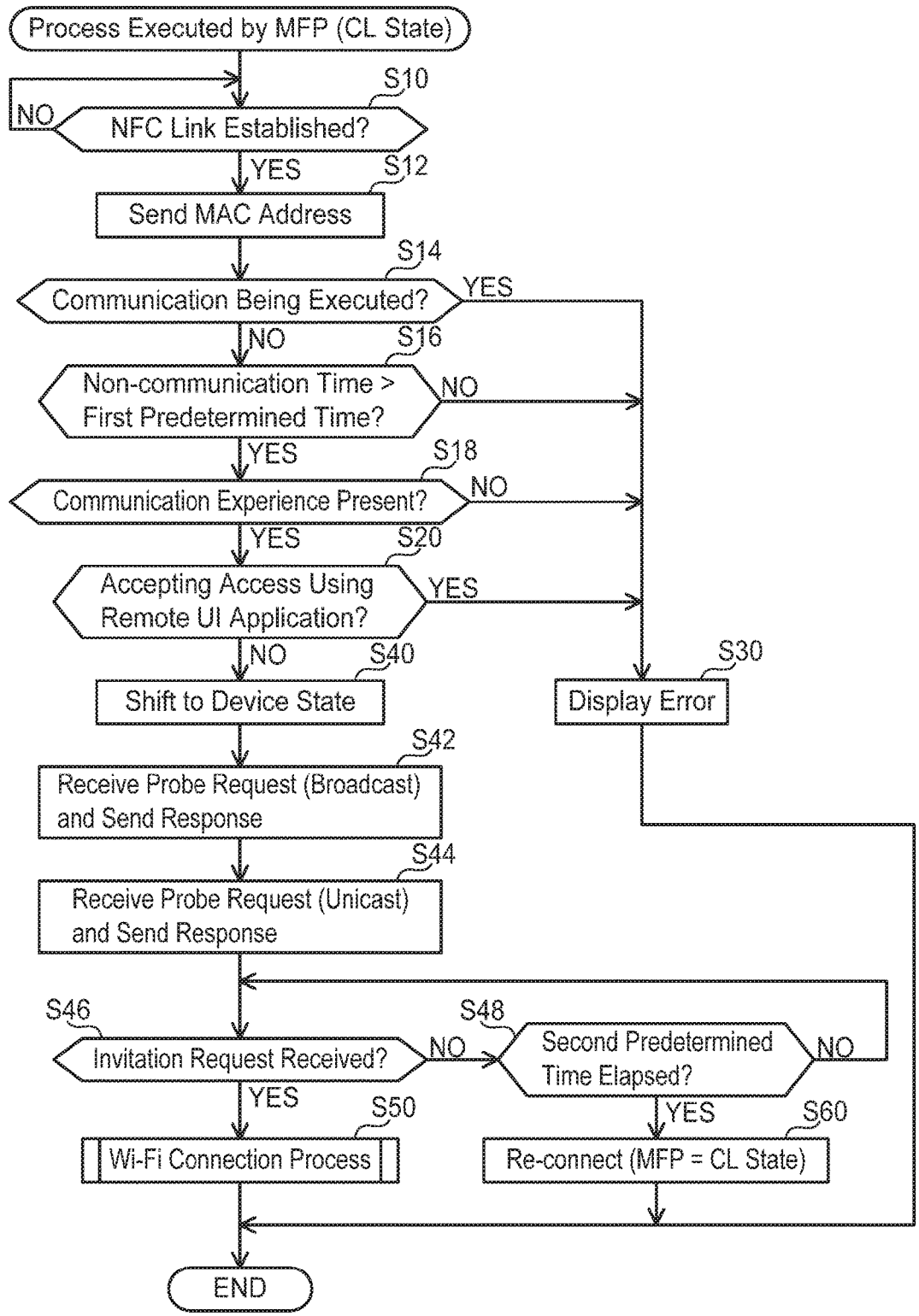
FIG. 3 shows a flowchart of a process executed by the MFP.

(Process Executed by MFP 10; FIG. 3)

Next, contents of a process executed by the CPU 32 of the MFP 10 in accordance with the program 36 will be described with reference to FIG. 3. The process of FIG. 3 is started when the MFP 10 shifts to the CL state. Below, the contents of the process of FIG. 3 will be described taking, as an example, the state where the MFP 10 participates as a child station (i.e., CL) in the first WFDNW in which the PC 200 operates as the parent station (i.e., G/O).

In S10, the CPU 32 monitors whether an NFC link is established between the MFP 10 and the mobile terminal 100. When the user brings the mobile terminal 100 closer to the MFP 10, a distance between the NFC I/F 122 of the mobile terminal 100 and the NFC I/F 22 of the MFP 10 becomes shorter than the maximum distance with which an NFC link can be established (e.g., 10 cm). As a result, an NFC link between the MFP 10 and the mobile terminal 100 is established. In a case of acquiring establishment information indicating that the NFC link has been established from the NFC I/F 22, the CPU 32 determines YES in S10, and proceeds to S12.

In S12, the CPU 32 sends the MAC address "AAA" of the MFP 10 to the mobile terminal 100 by using the established NFC link (i.e., via the NFC I/F 22).

In S14, the CPU 32 determines whether a Wi-Fi communication with the PC 200 is being executed. In a case where a TCP/IP communication using an upper layer than the data link layer of the OSI reference model (i.e., network layer, transport layer, session layer, presentation layer, and application layer) is being executed with the PC 200, the CPU 32 determines that a Wi-Fi communication with the PC 200 is being executed (YES in S14), and proceeds to S30. For example, the determination of YES is made in S14 in a case of receiving print data representing an image of a print target from the PC 200, or in a case of sending scan data generated by scanning to the PC 200. On the other hand, in a case where the TCP/IP communication is not being executed with the PC 200, the CPU 32 determines that a Wi-Fi communication with the PC 200 is not being executed (NO in S14), and proceeds to S16. That is, the CPU 32 determines that a Wi-Fi communication with the PC 200 is not being executed even if a communication using only a layer below the data link layer (e.g., communication of a beacon signal) is being executed with the PC 200.

In S30, the CPU 32 causes the display unit 14 to display an error screen indicating that it is impossible to establish a Wi-Fi connection with the MFP 10. When S30 ends, the process of FIG. 3 ends. That is, the CPU 32 does not shift the MFP 10 from the CL state to the device state (i.e., does not execute S40), does not disconnect the Wi-Fi connection with the PC 200, and does not establish a Wi-Fi connection with the mobile terminal 100 either.

Further, in S16, the CPU 32 determines whether a time during which a Wi-Fi communication with the PC 200 is not executed (called "non-communication time" below) is longer than a first predetermined time. The non-communication time is a time which has elapsed since a last Wi-Fi communication with the PC 200 completed. In a case of determining that the non-communication time is equal to or shorter than the first predetermined time (NO in S16), the CPU 32 proceeds to S30, and ends the process of FIG. 3 without shifting the MFP 10 from the CL state to the device state. For example, in a case where the user wishes to cause the MFP 10 to print a plurality of documents in the PC 200, the non-communication time exists in a time period between completion of a Wi-Fi communication of a first document (i.e., print data) and start of a Wi-Fi communication of a second document. In the case where the user wishes to print the plurality of documents in the PC 200, the Wi-Fi communication of the second document usually starts within a relatively short period of time from the completion of the Wi-Fi communication of the first document. If the Wi-Fi connection with the PC 200 is disconnected during the non-communication time between the Wi-Fi communication of the first document and the Wi-Fi communication of the second document, an event may occur that not all of the documents can be printed by the MFP 10. In order to suppress such an event from occurring, a configuration is adopted in which the Wi-Fi connection with the PC 200 is not disconnected in the case of determining that the non-communication time is equal to or shorter than the first predetermined time (NO in S16).

In S18, the CPU 32 determines whether there is a communication experience with the PC 200. In a case where a Wi-Fi communication with the PC 200 has been executed once or more times since the MFP 10 participated in the first WFDNW, the CPU 32 determines that there is a communication experience with the PC 200 (YES in S18), and proceeds to S20. On the other hand, in a case where a Wi-Fi communication with the PC 200 has not yet been executed, the CPU 32 determines that there is no communication experience with the PC 200 (NO in S18), proceeds to S30, and ends the process of FIG. 3 without shifting the MFP 10 from the CL state to the device state. The user of the PC 200 wishes to execute some Wi-Fi communication between the MFP 10 and the PC 200 after the Wi-Fi connection with the MFP 10 has been established. Therefore, there is a high possibility that the user may execute an operation for executing a Wi-Fi communication on the PC 200 when there is no communication experience with the PC 200. If the Wi-Fi connection with the PC 200 is disconnected in such a situation, it becomes impossible to execute the Wi-Fi communication wished by the user. In order to suppress such an event from occurring, a configuration is adopted in which the Wi-Fi connection with the PC 200 is not disconnected in the case of determining that there is no communication experience with the PC 200 (NO in S18).

In S20, the CPU 32 determines whether an access using the UI application 210 is being accepted from the PC 200. When the access using the UI application 210 is accepted from the PC 200, the memory 34 of the MFP 10 stores information indicating that the access is being accepted (called "access information" below). It should be noted that when information that informs of termination of the use of the UI application 210 is received from the PC 200, the access information is erased from the memory 34. In a case where the access information is not being stored in the memory 34, the CPU 32 determines that the access using the UI application 210 is not being accepted (NO in S20), and proceeds to S40. On the other hand, in a case where the access information is being stored in the memory 34, the CPU 32 determines that the access using the UT application 210 is being accepted (YES in S20), proceeds to S30, and ends the process of FIG. 3 without shifting the MFP 10 from the CL state to the device state. In a case where a button on a screen displayed on the display unit 14 of the MFP 10 is operated by the user under the state where the PC 200 is accessing the MFP 10 by using the UI application 210, a Wi-Fi communication between the PC 200 and the MFP 10 is executed. That is, in the situation where the UI application 210 is activated in the PC 200, information indicative of a button operation may be sent intermittently from the PC 200 to the MFP 10. In such a situation, if the Wi-Fi connection with the PC 200 is disconnected, an event may occur that an operation that the user wishes cannot be executed by the MFP 10. In order to suppress such an event from occurring, a configuration is adopted in which the Wi-Fi connection with the PC 200 is not disconnected in the case where the access using the UI application 210 is being accepted (YES in S20).

In S40, the CPU 32 shifts the MFP 10 from the CL state to the device state. Thereby, the Wi-Fi connection between the MFP 10 and the PC 200 is disconnected, and the MFP 10 leaves the first WFDNW.

In S42, the CPU 32 receives a Probe request from the mobile terminal 100 via the Wi-Fi I/F 20. The Probe request is a signal sent by broadcast from the mobile terminal 100 (i.e., a signal whose destination is not specified), and is a signal for searching for a device capable of establishing a Wi-Fi connection. Upon receiving the Probe request, the CPU 32 sends a Probe response including the MAC address "AAA" and the device name "XXX" to the mobile terminal 100 via the Wi-Fi I/F 20. It should be noted that generally, WFD devices in the CL state include a response sending function of sending a Probe response in a case of receiving a Probe signal from an external device. The WFD devices include a device capable of switching between enablement and disablement of the response sending function. Upon shifting from the device state to the CL state, the device capable of switching between enablement and disablement of the response sending function firstly operates in a state where the response sending function is disabled. This device is capable of switching the response sending function from disablement to enablement in a case where a signal for enabling the response sending function is received from the parent station. The MFP 10 is the WFD device capable of switching between enablement and disablement of the response sending function. In the present embodiment, the CL state means a state where the response sending function is disabled. Thus, the CPU 32 does not send a Probe response to the mobile terminal 100 even if receiving the Probe request from the mobile terminal 100 while the MFP 10 is in the CL state.

In S44, the CPU 32 receives a Probe request from the mobile terminal 100 via the Wi-Fi I/F 20. This Probe request includes the MAC address "AAA" of the MFP 10. That is, the Probe request is a signal sent by unicast from the mobile terminal 100 (i.e., a signal whose destination is specified), and is a signal for requesting the MFP 10 to establish a Wi-Fi connection. Upon receiving the Probe request, the CPU 32 sends a Probe response including the MAC address "AAA" and the device name "XXX" to the mobile terminal 100 via the Wi-Fi I/F 20. Thereby, the MFP 10 can inform the mobile terminal 100 that a Wi-Fi connection can be established with the MFP 10.

In S46, the CPU 32 determines whether an Invitation request including a Persistent flag is received from the mobile terminal 100 via the Wi-Fi I/F 20. The Invitation request is a signal for requesting participation in a WFDNW in which the mobile terminal 100 operates as a parent station (i.e., G/O). The Persistent flag is set to either of "ON" for requesting establishment of a Wi-Fi connection by using Persistent information without executing a WPS process, or "OFF" for requesting establishment of a Wi-Fi connection by executing the WPS process. The Persistent information is wireless setting information that was used for establishing a Wi-Fi connection between the MFP 10 and the mobile terminal 100 in the past, that is, it is wireless setting information that was used in a WFDNW formed by the mobile terminal 100 in the past. For example, if the MFP 10 has an experience of having participated in a second WFDNW formed by the mobile terminal 100, the memory 34 of the MFP 10 is storing Persistent information including the MAC address "BBB" of the mobile terminal 100, an SSID "YYY2" of the second WFDNW, and a password "PPP2" used in the second WFDNW. In a case of receiving the Invitation request (YES in S46), the CPU 32 executes a Wi-Fi connection process for establishing a Wi-Fi connection with the mobile terminal 100 in S50. When S50 ends, the process of FIG. 3 ends.

Further, simultaneously with the monitoring of S46, in S48, the CPU 32 monitors whether a second predetermined time has elapsed since the MFP 10 shifted from the CL state to the device state. If the second predetermined time has elapsed without receiving the Invitation request, the CPU 32 determines YES in S48, and proceeds to S60. It should be noted that, in a modification, the CPU 32 may monitor whether the Probe request of S42 is received, and proceed to S60 in a case where the second predetermined time has elapsed without receiving the Probe request. Further, in another modification, the CPU 32 may monitor whether the Probe request of S44 is received, and proceed to S60 in a case where the second predetermined time has elapsed without receiving the Probe request.

In S60, the CPU 32 re-establishes a Wi-Fi connection with the PC 200. Specifically, the CPU 32 sends a signal (e.g., Probe request, etc.) for requesting establishment of a Wi-Fi connection, to the PC 200 via the Wi-Fi I/F 20. As described above, a Wi-Fi connection between the MFP 10 and the PC 200 was established in the past, and thus the memory 34 of the MFP 10 is storing Persistent information including a MAC address "CCC" of the PC 200, the SSID "YYY1" of the first WFDNW, and the password "PPP1" used in the first WFDNW. Therefore, the CPU 32 can re-establish a Wi-Fi connection with the PC 200 by using the Persistent information (i.e., first wireless setting information) in the memory 34. As a result, the MFP 10 participates as a child station (i.e., CL) in the first WFDNW in which the PC 200 operates as the parent station (i.e., G/O). When S60 ends, the process of FIG. 3 ends.

Figure 4:
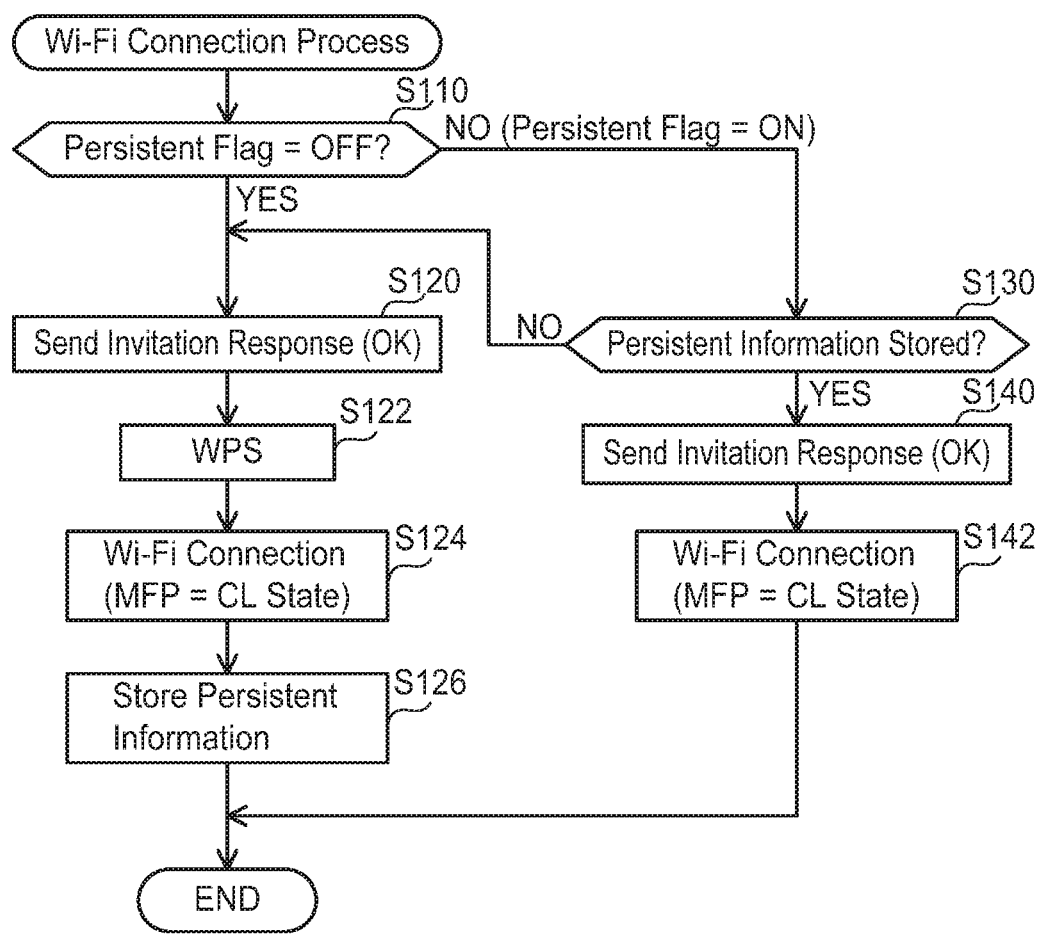
FIG. 4 shows a flowchart of a Wi-Fi connection process.

(Wi-Fi Connection Process; FIG. 4)

Next, the Wi-Fi connection process executed in S50 of FIG. 3 will be described with reference to FIG. 4.

In S110, the CPU 32 determines whether the Persistent flag in the Invitation request received in S46 of FIG. 3 indicates "OFF". The CPU 32 proceeds to S120 in a case where the flag indicates "OFF" (YES in S110), or proceeds to S130 in a case where the flag indicates "ON" (NO in S110). It should be noted, below, the Invitation request including the Persistent flag indicating "ON (or OFF)" is referred to as "Invitation request (ON (or OFF))".

In S120, the CPU 32 sends an Invitation response including OK information indicating that the WPS process is executable, to the mobile terminal 100.

In S122, the CPU 32 executes the WPS process. The WPS process includes a process of receiving wireless setting information for establishing a Wi-Fi connection with the mobile terminal 100 which operates as the parent station (i.e., G/O). Therefore, the CPU 32 receives, from the mobile terminal 100, second wireless setting information including the MAC address "BBB" of the mobile terminal 100, the SSID "YYY2" of the second WFDNW formed by the mobile terminal 100, and the password "PPP2" of the WFDNW.

In S124, the CPU 32 shifts from the device state to the CL state, and establishes a Wi-Fi connection with the mobile terminal 100 by using the second wireless setting information received in S122. Thereby, the MFP 10 can participate as a child station (i.e., CL) in the second WFDNW in which the mobile terminal 100 operates as the parent station (i.e., G/O).

In S126, the CPU 32 stores the second wireless setting information received in S122 in the memory 34 as the Persistent information.

Although not shown, when S126 ends, the CPU 32 can execute communications of various data with the mobile terminal 100 by using the Wi-Fi connection established in S124 (i.e., by using the second WFDNW). For example, the CPU 32 receives a function information request from the mobile terminal 100, and sends a function information response to the mobile terminal 100. The function information response includes information indicating that the MFP 10 is capable of executing the print function and the scan function. Thereby, the mobile terminal 100 can know the capability of the MFP 10. Further, for example, the CPU 32 can receive print data representing an image of a print target from the mobile terminal 100, and can send scan data obtained by scanning a document to the mobile terminal 100. Then, in a case where an operation for disconnecting the Wi-Fi connection with the MFP 10 is executed in the mobile terminal 100, the CPU 32 receives a disconnection request from the mobile terminal 100. Thereby, the Wi-Fi connection between the MFP 10 and the mobile terminal 100 is disconnected.

Further, in S130, the CPU 32 determines whether the Persistent information including the MAC address "BBB" of the mobile terminal 100 in the Invitation request (ON) received in S46 of FIG. 3 is being stored in the memory 34. The CPU 32 proceeds to S140 in a case of determining that the Persistent information is being stored in the memory 34 (YES in S130), or proceeds to S120 in a case of determining that the Persistent information is not being stored in the memory 34 (NO in S130). That is, in the case where the Persistent information is not being stored in the memory 34, the CPU 32 can execute the WPS process to establish a Wi-Fi connection with the mobile terminal 100 (S122, 124).

In S140, the CPU 32 sends an Invitation response including OK information indicating that a Wi-Fi connection can be established by using the Persistent information, to the mobile terminal 100.

In S142, the CPU 32 shifts from the device state to the CL state, and establishes a Wi-Fi connection with the mobile terminal 100, without executing the WPS process, by using the Persistent information in the memory 34 (i.e., the second wireless setting information). That is, even without receiving the second wireless setting information from the mobile terminal 100, the CPU 32 can establish the Wi-Fi connection with the mobile terminal 100 by using the second wireless setting information in the memory 34. Since the WPS process is not executed, the Wi-Fi connection between the MFP 10 and the mobile terminal 100 is established quickly. Thereby, the MFP 10 can participate as a child station (i.e., CL) in the second WFDNW in which the mobile terminal 100 operates as the parent station (i.e., G/O).

Although not shown, when S142 ends, the CPU 32 can execute communications of various data, such as print data and scan data, with the mobile terminal 100 by using the Wi-Fi connection established in S142 (i.e., by using the second WFDNW). Then, in the case where an operation for disconnecting the Wi-Fi connection with the MFP 10 is executed on the mobile terminal 100, the CPU 32 receives a disconnection request from the mobile terminal 100. Thereby, the Wi-Fi connection between the MFP 10 and the mobile terminal 100 is disconnected.

Figure 5:
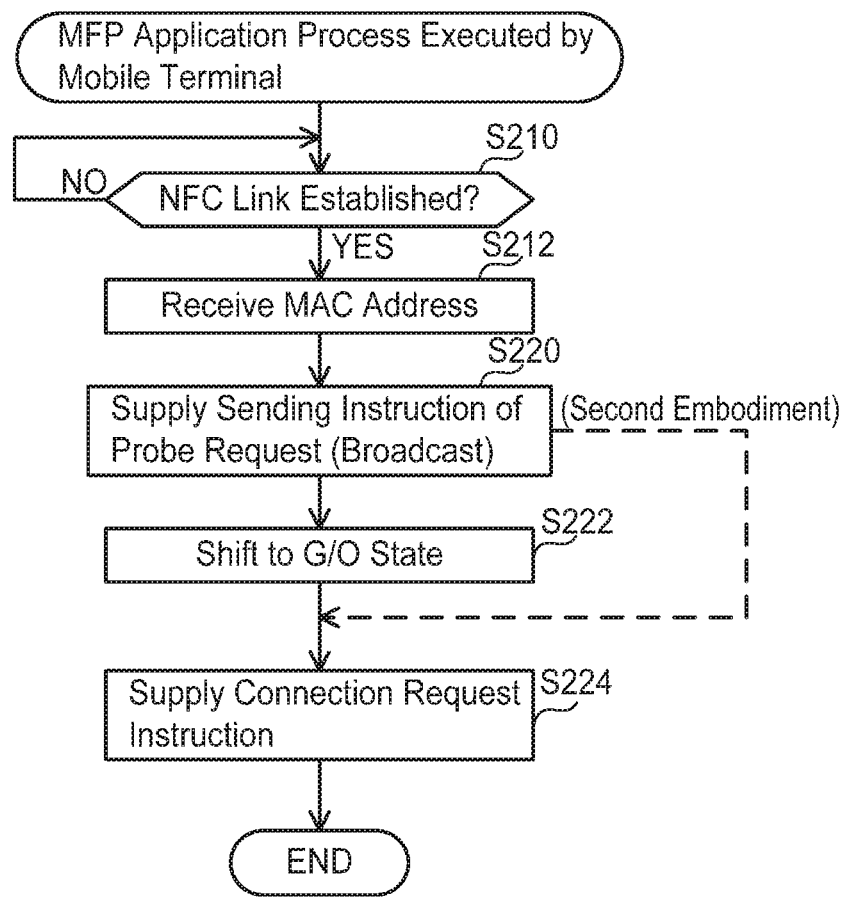
FIG. 5 shows a flowchart of an MFP application process executed by a mobile terminal.

(MFP Application Process Executed by Mobile Terminal 100; FIG. 5)

Next, contents of a process executed by the CPU 132 of the mobile terminal 100 in accordance with the MFP application 138 will be described with reference to FIG. 5. In a case where an operation for activating the MFP application 138 is executed on the terminal operation unit, the CPU 132 starts the process of FIG. 5. It should be noted, below, for the sake of convenience in the description, a subject of the process executed by the CPU 132 in accordance with the MFP application 138, and a subject of the process executed by the CPU 132 in accordance with the OS program 136 are referred to as "application 138" and "OS 136", respectively, without referring to the CPU 132 as the subject.

In S210, the application 138 monitors whether an NFC link is established between the MFP 10 and the mobile terminal 100. In a case of acquiring information indicating that an NFC link has been established from the NFC I/F 122, the application 138 determines YES in S210, and proceeds to S212.

In S212, the application 138 receives the MAC address "AAA" of the MFP 10 from the MFP 10 via the NFC I/F 122.

In S220, the application 138 supplies, to the OS 136, an instruction for sending a Probe request by broadcast. In this case, the OS 136 supplies the instruction to the Wi-Fi I/F 120. In response to sending of the Probe request, the OS 136 receives, from the MFP 10 via the Wi-Fi I/F 120, a Probe response including the MAC address "AAA" of the MFP 10 and the device name "XXX" of the MFP 10. Then, the OS 136 supplies the MAC address and the device name to the application 138.

In S222, the application 138 shifts the operation state of the mobile terminal 100 from the device state to the G/O state. As a result, the OS 136 forms the second WFDNW in which the mobile terminal 100 operates as the parent station (i.e., as G/O), and generates the second wireless setting information (i.e., SSID "YYY2", "PPP2", etc.) to be used in the second WFDNW. It should be noted, in a modification, the application 138 may shift the operation state of the mobile terminal 100 from a state where SoftAP is not activated to a state where the SoftAP is activated. In this case as well, a wireless network is formed in which the mobile terminal 100 operates as a parent station.

In S224, the application 138 supplies a connection request instruction to the OS 136. The connection request instruction includes an instruction for sending a Probe request including the MAC address "AAA" received in S212, and an instruction for sending an Invitation request. Upon acquiring the connection request instruction, the OS 136 supplies, to the Wi-Fi I/F 120, the instruction for sending the Probe request including the MAC address "AAA". The OS 136 receives a Probe response from the MFP 10 via the Wi-Fi I/F 120 in response to sending of the Probe request. Then, the OS 136 determines whether Persistent information including the MAC address "AAA" of the MFP 10 is being stored in the memory 134. In a case of determining that the Persistent information is being stored, the OS 136 supplies an instruction for sending an Invitation request including the Persistent flag "ON" to the Wi-Fi I/F 120, or in a case of determining that the Persistent information is not being stored, the OS 136 supplies an instruction for sending an Invitation request including the Persistent flag "OFF" to the Wi-Fi I/F 120. The OS 136 receives an Invitation response from the MFP 10 via the Wi-Fi I/F 120 in response to sending of the Invitation request.

Thereafter, the OS 136 executes a process for establishing a Wi-Fi connection with the MFP 10. For example, in the case where the Persistent information including the MAC address "AAA" of the MFP 10 is not being stored, the OS 136 executes the WPS process to establish a Wi-Fi connection with the MFP 10. In this case, the OS 136 stores, in the memory 134, Persistent information including the MAC address "AAA" and the second wireless setting information generated in S222. Further, for example, in the case where the Persistent information including the MAC address "AAA" of the MFP 10 is being stored, the OS 136 establishes a Wi-Fi connection with the MFP 10 by using the Persistent information, without executing the WPS process. When S224 ends, the process of FIG. 5 ends.

Thereafter, although not shown, by using the Wi-Fi connection, the application 138 can send the function information request to the MFP 10 and receive the function information response from the MFP 10, and execute a communication of print data or scan data with the MFP 10.

(Specific Case)

Figure 6:
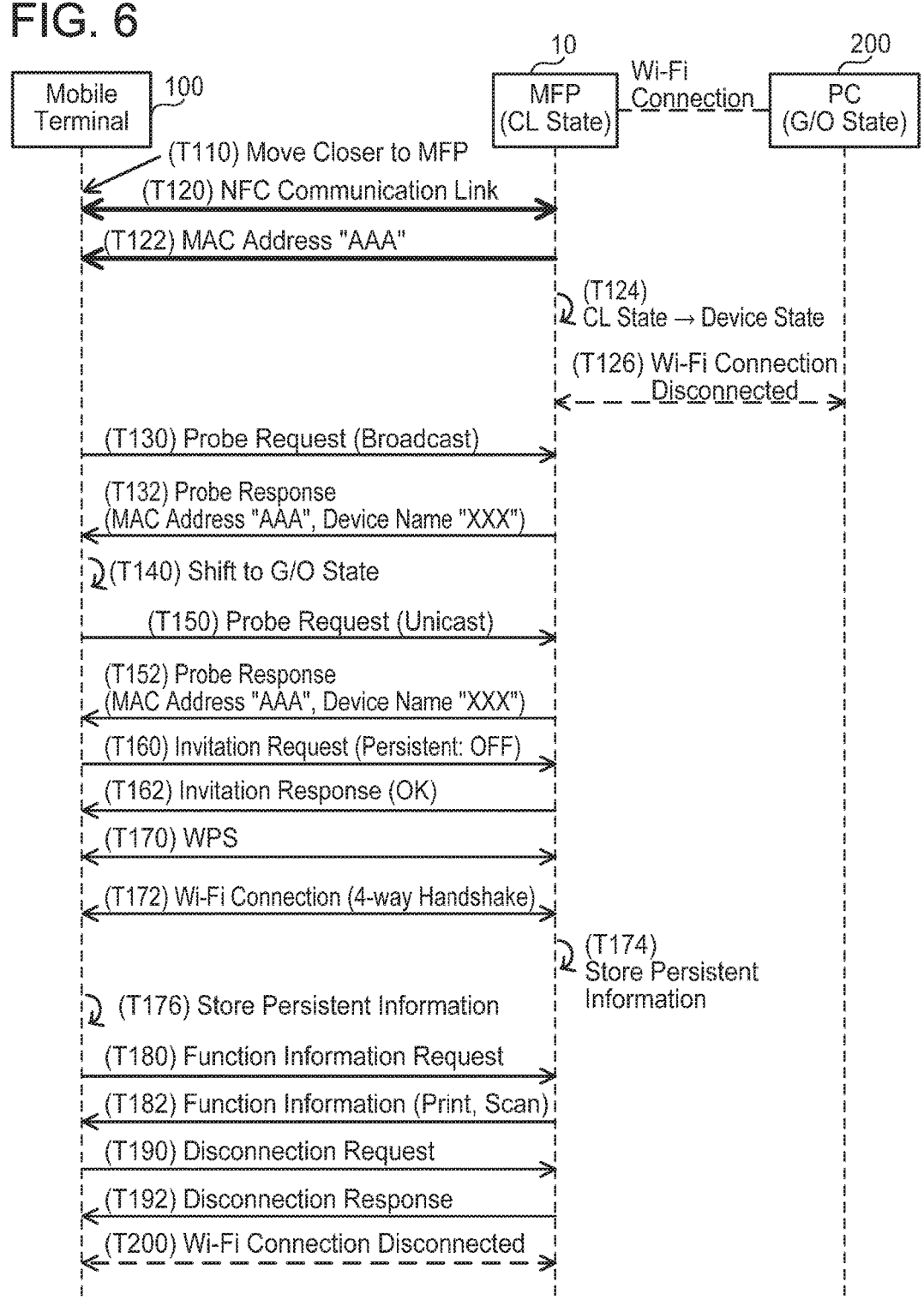
FIG. 6 shows a sequence diagram of a case where an NFC link is established between the mobile terminal and the MFP.

Next, a specific case realized by the processes of FIG. 3 to FIG. 5 will be described with reference to FIG. 6. In FIG. 6, thick arrows indicate NFC communication, and thin arrows indicate Wi-Fi communication.

FIG. 6 is a state after the process of FIG. 2 has been executed, that is, the state in which the Wi-Fi connection between the MFP 10 and the PC 200 has been established, and the MFP 10 is participating in the first WFDNW as a child station (i.e., CL). Further, the MFP 10 has already executed a Wi-Fi communication of print data, scan data, or the like with the PC 200. Further, the first predetermined time has elapsed since the last Wi-Fi communication between the MFP 10 and the PC 200 was completed. Further, the MFP 10 is not accepting the access using the UI application 210. Further, there is no experience that a Wi-Fi connection has been established between the MFP 10 and the mobile terminal 100, and the Persistent information is not being stored in either the MFP 10 or the mobile terminal 100.

When the user moves the mobile terminal 100 closer to the MFP 10 in T110, an NFC link between the MFP 10 and the mobile terminal 100 is established in T120 (YES in S10 of FIG. 3, YES in S210 of FIG. 5).

In T122, the MFP 10 sends the MAC address "AAA" to the mobile terminal 100 by using the NFC link (S12 of FIG. 3). Then, the MFP 10 determines that a Wi-Fi communication with the PC 200 is not being executed (NO in S14), determines that the non-communication time is longer than the first predetermined time (YES in S16), determines that there is communication experience with the PC 200 (YES in S18), and determines that the access using the UI application 210 is not being accepted (NO in S20). Then, in T124, the MFP 10 shifts from the CL state to the device state (S40), and in T126, the Wi-Fi connection between the MFP 10 and the PC 200 is disconnected.

The mobile terminal 100 sends a Probe request by broadcast in T130 (S220 of FIG. 5).

Upon receiving the Probe request from the mobile terminal 100 in T130, in T132, the MFP 10 sends a Probe response including the MAC address "AAA" and the device name "XXX" to the mobile terminal 100 (S42 of FIG. 3). It should be noted that the MFP 10 in the CL state does not send the Probe response to the mobile terminal 100 even when receiving the Probe request sent by broadcast from the mobile terminal 100. In this case, T132 and its subsequent processes are not executed.

Upon receiving the Probe response from the MFP 10 in T132 (S220 of FIG. 5), in T140, the mobile terminal 100 shifts to the G/O state (S222). Thereby, the mobile terminal 100 forms the second WFDNW, and generates the second wireless setting information (i.e., SSID "YYY2", password "PPP2", etc.) to be used in the WFDNW. Then, the mobile terminal 100 sends a Probe request including the MAC address "AAA" to the MFP 10 in T150 (S224).

Upon receiving the Probe request from the mobile terminal 100 in T150, the MFP 10 sends a Probe response including the MAC address "AAA" and the device name "XXX" to the mobile terminal 100 in T152 (S44 of FIG. 3).

Upon receiving the Probe response from the MFP 10 in T152, the mobile terminal 100 determines that Persistent information including the MAC address "AAA" of the MFP 10 is not being saved, and sends an Invitation request (OFF) to the MFP 10 in T160 (S224 of FIG. 6).

Upon receiving the Invitation request (OFF) from the mobile terminal 100 in T160 (YES in S46 of FIG. 3), the MFP 10 determines that the Persistent flag is "OFF" (YES in S110 of FIG. 4), and in T162, sends an Invitation response including OK information to the mobile terminal 100 (S120).

In T170, the WPS process is executed between the MFP 10 and the mobile terminal 100 (S122 of FIG. 4). Specifically, the MFP 10 receives, from the mobile terminal 100, the second wireless setting information including the SSID "YYY2" of the second WFDNW and the password "PPP2" of the second WFDNW. Then, in T172, communications of a 4-way Handshake and the like are executed between the MFP 10 and the mobile terminal 100, and a Wi-Fi connection is established (S124). Thereby, the MFP 10 participates as a child station in the second WFDNW in which the mobile terminal 100 operates as the parent station.

In T174, the MFP 10 stores Persistent information including the MAC address "BBB" of the mobile terminal 100 and the second wireless setting information received in T170, in the memory 34 (S126 of FIG. 4).

Further, in T176, the mobile terminal 100 stores Persistent information including the MAC address "AAA" of the MFP 10 and the second wireless setting information sent in T170, in the memory 134. Then, in T180, the mobile terminal 100 sends, to the MFP 10, a function information request for confirming the functions executable by the MFP 10 by using the Wi-Fi connection, and in T182, receives a function information response indicating that the print function and scan function are executable from the MFP 10 by using the Wi-Fi connection.

In T190, the mobile terminal 100 sends a disconnection request to the MFP 10 by using the Wi-Fi connection, and in T192, receives a disconnection response from the MFP 10 by using the Wi-Fi connection. Thereby, in T200, the Wi-Fi connection between the MFP 10 and the mobile terminal 100 is disconnected.

Effect of First Embodiment

In the state where the MFP 10 is participating as a child station in the first WFDNW in which the PC 200 is the parent station, the MFP 10 cannot belong to the second WFDNW to which the mobile terminal 100 belongs. That is, in the state where the MFP 10 is participating as a child station in the first WFDNW, a Wi-Fi connection between the MFP 10 and the mobile terminal 100 cannot be established. According to the present embodiment, in the case where an NFC link with the mobile terminal 100 is established under the state where the MFP 10 is participating as a child station in the first WFDNW in which the PC 200 is the parent station, the MFP 10 shifts from the CL state to the device state. Then, upon receiving the Invitation request from the mobile terminal 100, the MFP 10 can establish a Wi-Fi connection with the mobile terminal 100 via the Wi-Fi I/F 20, and belong to the second WFDNW. Consequently, instead of the state of the MFP 10 participating as a child station in the first WFDNW in which the PC 200 is the parent station, the MFP 10 and the mobile terminal 100 can belong to the same second WFDNW.

Further, in the state where the MFP 10 is participating as a child station in the first WFDNW in which the PC 200 is the parent station (i.e., in the CL state), the MFP 10 does not send the Probe response to the mobile terminal 100 even when receiving the Probe request sent by broadcast from the mobile terminal 100. In this case, the MFP 10 does not receive the Invitation request from the mobile terminal 100. Thus, if a configuration is employed in which the operation state of the MFP 10 is maintained in the CL state even when the NFC link is established between the MFP 10 and the mobile terminal 100, the Wi-Fi connection is not established between the MFP 10 and the mobile terminal 100. In the present embodiment, when the NFC link is established with the mobile terminal 100 (T120 of FIG. 6), the MFP 10 shifts from the CL state to the device state (T124). Due to this, upon receiving the Probe request sent by broadcast from the mobile terminal 100 (T130), the MFP 10 sends the Probe response to the mobile terminal 100 (T132). Then, upon receiving the Probe request sent by unicast from the mobile terminal 100 (T150), the MFP 10 sends the Probe response to the mobile terminal 100 (T152). Further, the MFP 10 receives the Invitation request from the mobile terminal 100. As a result, the MFP 10 can establish the Wi-Fi connection with the mobile terminal 100 via the Wi-Fi I/F 20, and can belong to the second WFDNW (T172).

(Correspondence Relationships)

The MFP 10, the PC 200 and the mobile terminal 100 are an example of "communication device", "first external device" and "second external device", respectively. The Wi-Fi I/F 20 and the NFC I/F 22 are an example of "first wireless interface" and "second wireless interface", respectively. The remote UI application 210 is an example of "specific application". The device state of T124 of FIG. 6 is an example of "specific state". The first WFDNW and the second WFDNW are an example of "first wireless network" and "second wireless network", respectively. The NFC link and the Wi-Fi connection are an example of "first wireless connection" and "second wireless connection". The Invitation request is an example of "request signal". The error screen is an example of "predetermined screen".

T130, T132, T150, and T152 of FIG. 6 are an example of process executed in "communication for a trigger of sending the request signal to the communication device".

Second Embodiment

Figure 7:
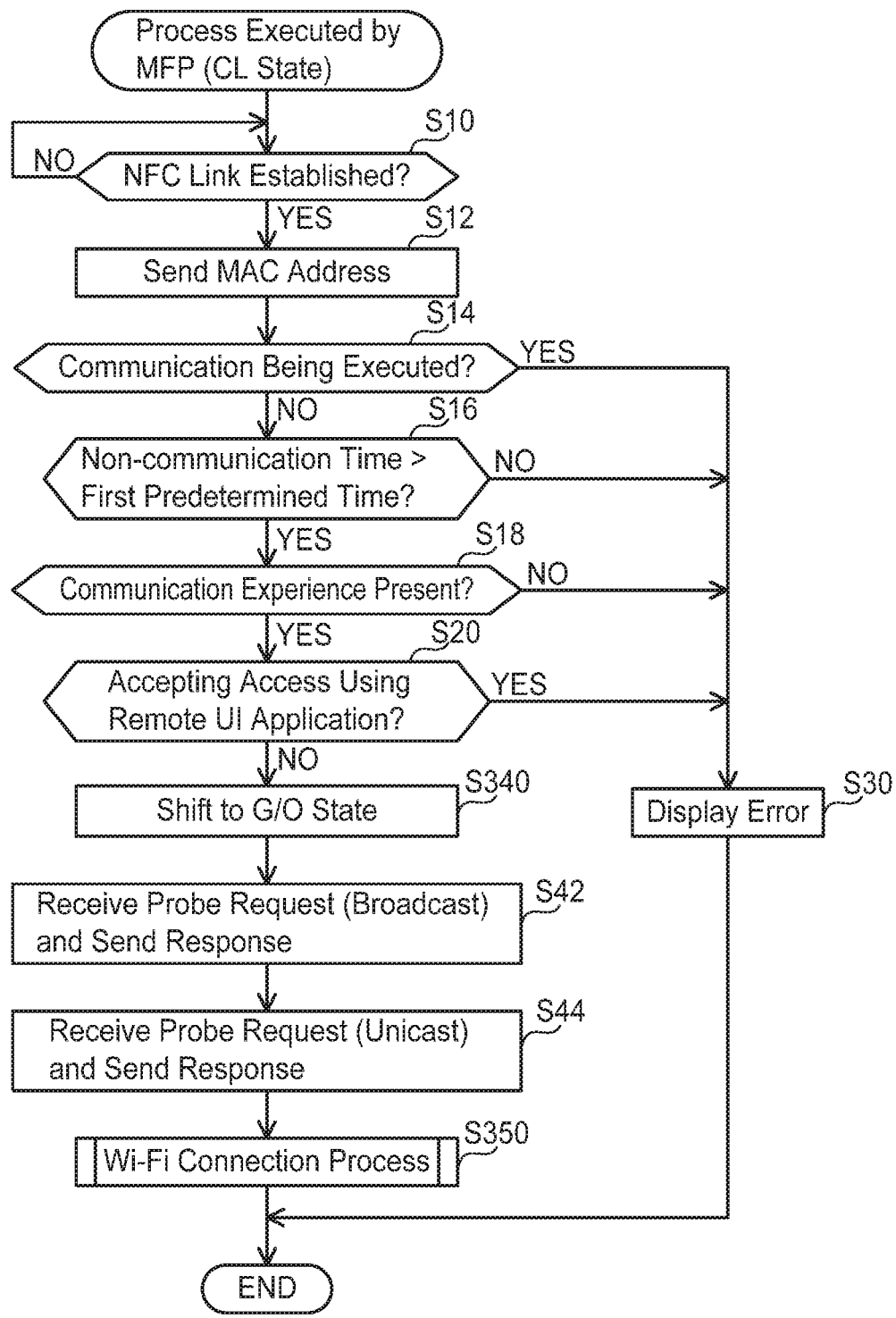
FIG. 7 shows a flowchart of a process executed by the MFP, of a second embodiment.
Figure 8:
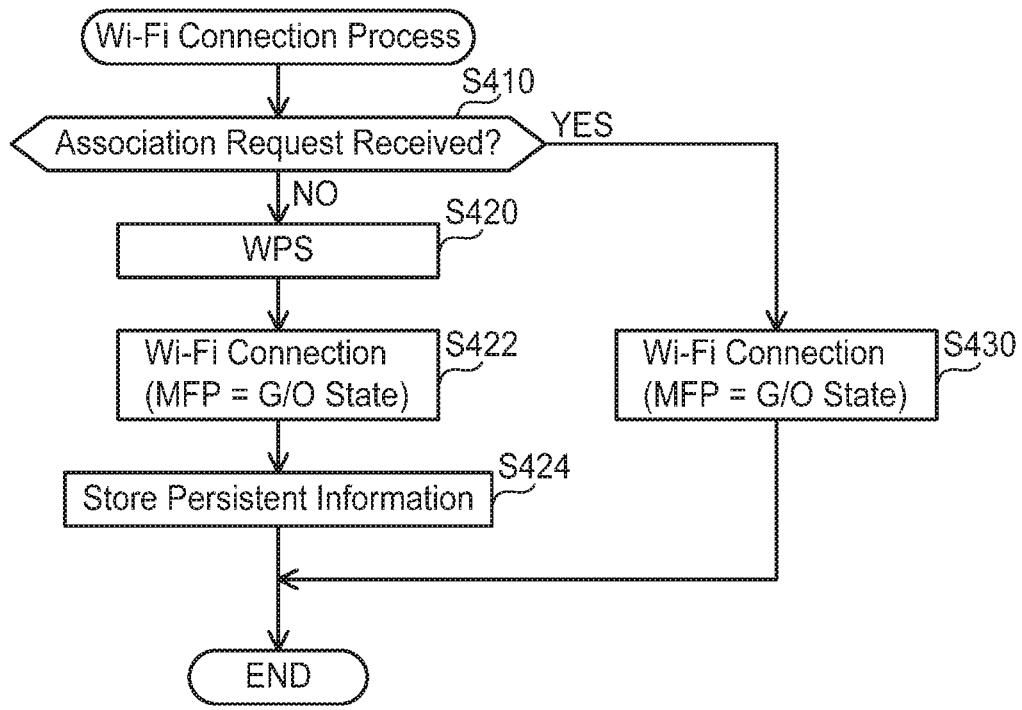
FIG. 8 shows a flowchart of a Wi-Fi connection process of the second embodiment.

In the present embodiment, the MFP 10 executes processes of FIG. 7 and FIG. 8, instead of the processes of FIG. 3 and FIG. 4. Further, the MFP application process of FIG. 5 executed by the mobile terminal 100 differs from the first embodiment. It should be noted that mutual processes between the embodiments are denoted with the same reference signs, and an explanation thereof will be omitted.

(Process Executed by MFP 10; FIG. 7)

Contents of a process executed by the CPU 32 of the MFP 10 in accordance with the program 36 will be described with reference to FIG. 7.

In S340, the CPU 32 shifts the MFP 10 from the CL state to the GI/O state. Specifically, the CPU 32 shifts the MFP 10 from the CL state to the device state, and further shifts the MFP 10 from the device state to the G/O state. Thereby, the Wi-Fi connection between the MFP 10 and the PC 200 is disconnected, and the MFP 10 leaves the first WFDNW. Then, the MFP 10 forms a third WFDNW, and generates third wireless setting information (i.e., SSID "YYY3", password "PPP3") to be used in the WFDNW. Then, when S42 and S44 end, the CPU 32 executes a Wi-Fi connection process (FIG. 8) in S350. It should be noted that in S42 and S44, the CPU 32 sends Probe responses including the SSID "YYY3" to the mobile terminal 100.

(Wi-Fi Connection Process; FIG. 8)

Next, the Wi-Fi connection process executed in S350 of FIG. 7 will be described with reference to FIG. 8.

In S410, the CPU 32 determines whether an Association request is received from the mobile terminal 100. In a case of requesting establishment of a Wi-Fi connection by using Persistent information without executing the WPS process, the mobile terminal 100 sends the Association request to the MFP 10. That is, the mobile terminal 100 sends the Association request to the MFP 10 in a case where a connection between the MFP 10 and the mobile terminal 100 has been established before, and the Persistent information is being stored in the memory 134 of the mobile terminal 100. The CPU 32 proceeds to S420 in a case of not receiving the Association request from the mobile terminal 100 (NO in S410). On the other hand, the CPU 32 proceeds to S430 in a case of receiving the Association request from the mobile terminal 100 (YES in S410).

In S420, the CPU 32 executes a WPS process. The WPS process includes a process of sending, to the mobile terminal 100, the third wireless setting information (i.e., the SSID "YYY3", the password "PPP3", etc.) for establishing a Wi-Fi connection with the MFP 10 operating as the parent station (i.e., G/O).

In S422, the CPU 32 establishes a Wi-Fi connection with the mobile terminal 100 by using the third wireless setting information. Thereby, the MFP 10 can cause the mobile terminal 100 to participate as a child station (i.e., CL) in the third WFDNW.

In S424, the CPU 32 stores the third wireless setting information sent in S422 in the memory 34 as Persistent information.

Further, in S430, the CPU 32 establishes a Wi-Fi connection with the mobile terminal 100, without executing the WPS process, by using the Persistent information (i.e., the third wireless setting information) in the memory 34. Thereby, the MFP 10 can cause the mobile terminal 100 to participate as a child station (i.e., CL) in the third WFDNW.

(MFP Application Process Executed by Mobile Terminal 100; FIG. 5)

Next, contents of a process executed by the CPU 132 of the mobile terminal 100 of the present embodiment in accordance with the MFP application 138 will be described with reference to FIG. 5. In the present embodiment, when S220 ends, the application 138 omits S222, and proceeds to S224. That is, the application 138 does not shift the operation state of the mobile terminal 100 from the device state.

In S224, the application 138 supplies a connection request instruction to the OS 136. The connection request instruction includes an instruction for sending a Probe request including the MAC address "AAA" received in S212, and an instruction for sending an Association request. Upon acquiring the connection request instruction, the OS 136 supplies the instruction for sending the Probe request including the MAC address "AAA" to the Wi-Fi I/F 120. In response to sending of the Probe request, the OS 136 receives a Probe response from the MFP 10 via the Wi-Fi I/F 120. Then, the OS 136 determines whether Persistent information including the MAC address "AAA" of the MFP 10 is being stored in the memory 134. In a case of determining that the Persistent information is being stored, the OS 136 supplies the instruction for sending the Association request to the Wi-Fi I/F 120. Thereafter, the OS 136 executes a process for establishing a Wi-Fi connection with the MFP 10. On the other hand, in a case of determining that the Persistent information is not being stored, the OS 136 executes the process for establishing a Wi-Fi connection with the MFP 10 without supplying the instruction for sending the Association request to the Wi-Fi I/F 120. When S224 ends, the process of FIG. 5 ends.

(Specific Case)

Figure 9:
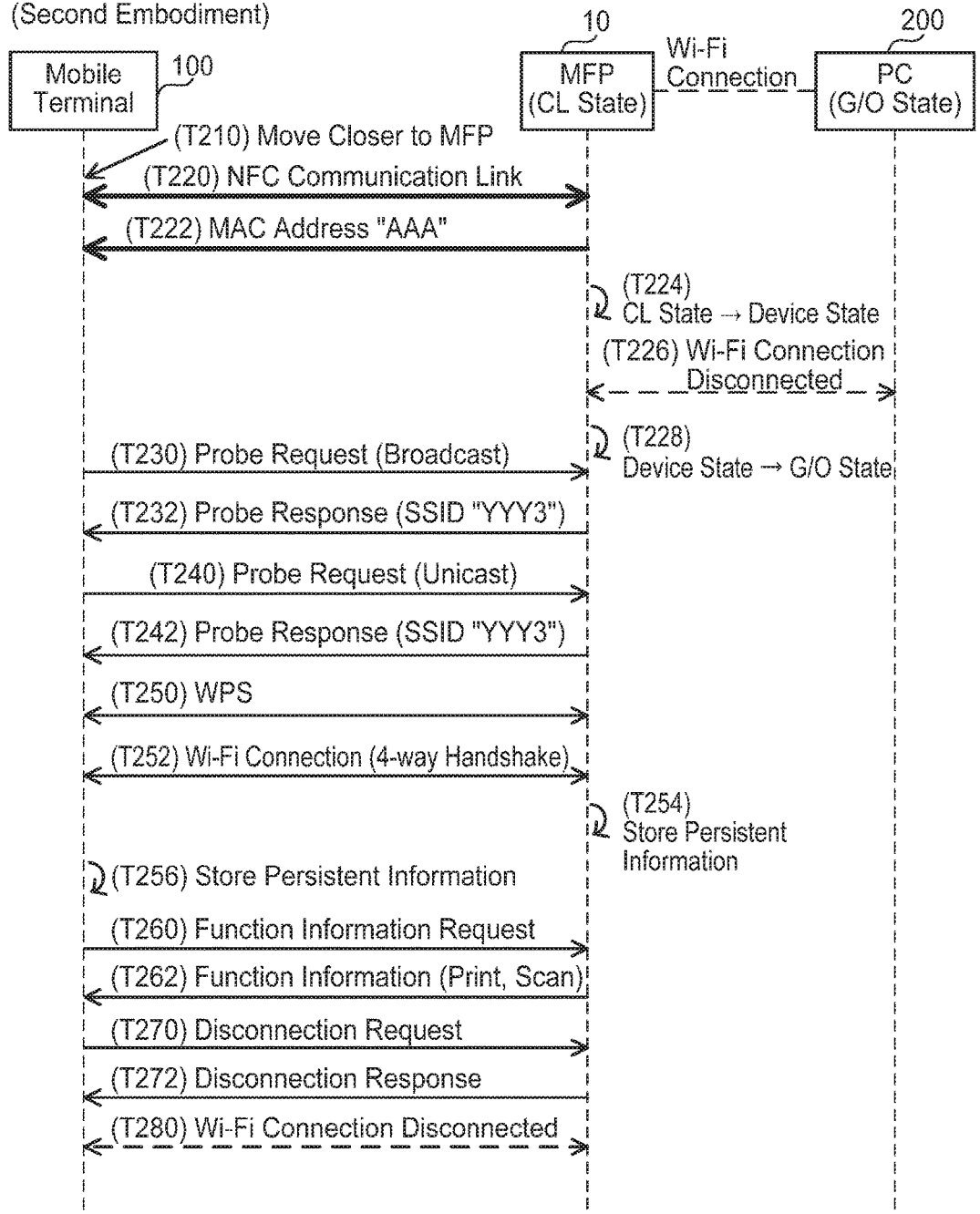
FIG. 9 shows a sequence diagram of a case where an NFC link is established between the mobile terminal and the MFP in the second embodiment.

Next, a specific case realized by the processes of FIG. 5, FIG. 7, and FIG. 8 will be described with reference to FIG. 9. An initial state of FIG. 9 is the same as the initial state of FIG. 6.

T210 to T226 are the same as T110 to T126 of FIG. 6. In T228, the MFP 10 shifts from the device state to the G/O state (S340 of FIG. 7). Thereby, the MFP 10 forms the third WFDNW, and generates the third wireless setting information (i.e., the SSID "YYY3", the password "PPP3", etc.) to be used in the WFDNW. T230, T240 are the same as T130, T150 of FIG. 6, and T232, T242 are the same as T132, T152, except the point that the SSID "YYY3" is included in the Probe responses. It should be noted that the MFP 10 in the CL state does not send the Probe response to the mobile terminal 100 even when receiving the Probe request sent by broadcast from the mobile terminal 100. In this case, T232 and its subsequent processes are not executed.

In T250, the MFP 10 executes the WPS process with the mobile terminal 100 without receiving an Association request. Specifically, the MFP 10 sends, to the mobile terminal 100, the third wireless setting information including the SSID "YYY3" of the third WFDNW and the password "PPP3" of the WFDNW. Then, in T252, communications of a 4-way Handshake and the like are executed between the MFP 10 and the mobile terminal 100, and a Wi-Fi connection is established (S422 of FIG. 8). Thereby, the MFP 10 causes the mobile terminal 100 to participate as a child station in the third WFDNW. T254 to T280 are the same as T174 to T200 of FIG. 6.

Effect of Second Embodiment

According to the present embodiment, in the case where the NFC link with the mobile terminal 100 is established under the state where the MFP 10 is participating as a child station in the first WFDNW in which the PC 200 is the parent station, the MFP 10 shifts from the CL state to the G/O state. Then, upon receiving the Probe request sent by unicast, the MFP 10 can establish the Wi-Fi connection with the mobile terminal 100 via the Wi-Fi I/F 20. Consequently, instead of the state of the MFP 10 participating as a child station in the first WFDNW in which the PC 200 is the parent station, the MFP 10 and the mobile terminal 100 can belong to the same third WFDNW.

Further, in the state where the MFP 10 is participating as a child station in the first WFDNW in which the PC 200 is the parent station (i.e., in the CL state), the MFP 10 does not send the Probe response to the mobile terminal 100 even when receiving the Probe request sent by broadcast from the mobile terminal 100. In this case, the MFP 10 does not receive the Probe request sent by unicast from the mobile terminal 100. Thus, if a configuration is employed in which the operation state of the MFP 10 is maintained in the CL state even when the NFC link is established between the MFP 10 and the mobile terminal 100, the Wi-Fi connection is not established between the MFP 10 and the mobile terminal 100. In the present embodiment, in the case where the NFC link is established with the mobile terminal 100 (T220 of FIG. 9), the MFP 10 shifts from the CL state to the device state (1224), and shifts from the device state to the G/O state (T228). Due to this, upon receiving the Probe request sent by broadcast from the mobile terminal 100 (T230), the MFP 10 sends the Probe response to the mobile terminal 100 (T232). Then, upon receiving the Probe request sent by unicast from the mobile terminal 100 (T240), the MFP 10 sends the Probe response to the mobile terminal 100 (T242). As a result, the MFP 10 can establish the Wi-Fi connection with the mobile terminal 100 via the Wi-Fi I/F 20 (T252).

(Correspondence Relationships)

The G/O state of T228 of FIG. 9 is an example of "specific state". The first WFDNW and the third WFDNW are an example of "first wireless network" and "second wireless network", respectively. The Probe request sent by unicast is an example of "request signal".

T230 and T232 of FIG. 9 are an example of process executed in "communication for a trigger of sending the request signal to the communication device"

(Modification 1)

The mobile terminal 100 and the MFP 10 may be "communication device" and "second external device", respectively. In this case, in the case where the NFC link with the MFP 10 is established under the state where the mobile terminal 100 is operating as a child station of the first WFDNW in which the PC 200 operates as the parent station, the mobile terminal 100 is shifted from the CL state to the device state. Then, in the case where the Invitation request for requesting participation in the third WFDNW in which the MFP 10 operates as the parent station is received via the Wi-Fi I/F 120 after the mobile terminal 100 has been shifted to the device state, the CPU 132 establishes a Wi-Fi connection with the MFP 10. Thereby, the mobile terminal 100 and the MFP 10 can belong to the same third WFDNW.

(Modification 2)

S14 to S30 of FIG. 3 may be omitted, and S40 may be executed when S12 ends. In the present modification, "determine whether a wireless communication using the first wireless network is being executed", "determine whether a non-communication time is longer than a first predetermined time", "determine whether the communication device is in a non-communication state", "determine whether the first external device that comprises a specific application is accessing to the communication device", and "display a predetermined screen" may be omitted.

(Modification 3)

S48 and S60 of FIG. 3 may be omitted. In this case, "establish a third wireless connection" may be omitted.

(Modification 4)

"Second wireless interface" may not be an I/F for executing an NFC communication, but may be, for example, an I/F for executing a wireless communication in accordance with another communication scheme such as BlueTooth (registered trademark), infrared, TransferJet, etc.

(Modification 5)

"Communication device" may not be the MFP 10, but may be a printer capable of executing only the print function, a scanner capable of executing only the scan function, a PC, a mobile terminal, or the like.

(Modification 6)

In the above embodiments, the processes of FIG. 3, FIG. 4, FIG. 7, and FIG. 8 are realized by the CPU 32 of the MFP 10 executing the program 36 (i.e., software). Instead, the processes of FIG. 3, FIG. 4, FIG. 7, and FIG. 8 may be realized by hardware such as a logic circuit.

(Modification 7-1)

In the modifications of the first embodiment, the mobile terminal 100 does not send the Probe request by broadcast or by unicast upon establishing the Wi-Fi connection with the MFP 10. That is, processes of T130, T132, T150, and T152 of FIG. 6 are omitted. Upon when the NFC link is established with the mobile terminal 100 (T120) and the MAC address "AAA" is sent to the mobile terminal 100 (T122), the MFP 10 shifts from the CL state to the device state (T124). Upon receiving the MAC address "AAA" from the MFP 10 (T122), the mobile terminal 100 shifts to the G/O state (T140) and sends the Invitation request to the MFP 10 (T160). Upon receiving the Invitation request from the mobile terminal 100 (T160), the MFP 10 sends the Invitation response to the mobile terminal 100 (T162). As a result, the WPS process is executed between the MFP 10 and the mobile terminal 100 (T170), and the Wi-Fi connection is established between the MFP 10 and the mobile terminal 100 (T172).

In the present modification, in the state where the MFP 10 is participating as a child station in the first WFDNW in which the PC 200 is the parent station (i.e., in the CL state), the MFP 10 does not send the Invitation response to the mobile terminal 100 even when receiving the Invitation request from the mobile terminal 100. Due to this, if a configuration is employed in which the operation state of the MFP 10 is maintained in the CL state even when the NFC link is established between the MFP 10 and the mobile terminal 100, the Wi-Fi connection is not established between the MFP 10 and the mobile terminal 100. Contrary to this, in the present modification, in the case where the NFC link is established with the mobile terminal 100 (T120), the MFP 10 shifts from the CL state to the device state (T124). Thus, upon receiving the Invitation request from the mobile terminal 100 (T160), the MFP 10 sends the Invitation response to the mobile terminal 100 (T162), and can suitably establish the Wi-Fi connection with the mobile terminal 100 (T172). In the present modification, the Invitation request and the Invitation response are examples of "request signal" and "response signal", respectively.

(Modification 7-2)

In this modification, the mobile terminal 100 does not send the Probe request by broadcast when the Wi-Fi connection is established with the MFP 10. That is, processes of T230 and T232 of FIG. 9 are omitted. Upon when the NFC link with the mobile terminal 100 is established (T220) and the MAC address "AAA" is sent to the mobile terminal 100 (T222), the MFP 10 shifts from the CL state to the device state (T224), and shifts from the device state to the G/O state (T228). Further, upon receiving the MAC address "AAA" from the MFP 10 (1222), the mobile terminal 100 sends the Probe request by unicast to the MFP 10 (T240). Upon receiving the Probe request from the mobile terminal 100, the MFP 10 sends the Probe response to the mobile terminal 100 (T242). As a result, the WPS process is executed between the MFP 10 and the mobile terminal 100 (T250), and the Wi-Fi connection is established between the MFP 10 and the mobile terminal 100 (T252).

In the present modification, in the state where the MFP 10 is participating as a child station in the first WFDNW in which the PC 200 is the parent station (i.e., in the CL state), the MFP 10 does not send the Probe response to the mobile terminal 100 even when receiving the Probe request sent by unicast from the mobile terminal 100. Thus, if a configuration is employed in which the operation state of the MFP 10 is maintained in the CL state even when the NFC link is established between the MFP 10 and the mobile terminal 100, the Wi-Fi connection is not established between the MFP 10 and the mobile terminal 100. Contrary to this, in the present embodiment, in the case where the NFC link is established with the mobile terminal 100, the MFP 10 shifts from the CL state to the G/O state (1224, T228). Thus, upon receiving the Probe request sent by unicast from the mobile terminal 100 (T240), the MFP 10 sends the Probe response (T242), and can suitably establish the Wi-Fi connection with the mobile terminal 100 (T252). In the present modification, the Probe request sent by unicast in T240 and the Probe response sent in T242 are examples of "request signal" and "response signal", respectively.

What is claimed is:

1. A communication device comprising:
   a first wireless interface;
   a second wireless interface different from the first wireless interface, wherein a communication speed of a wireless communication via the second wireless interface is slower than a communication speed of a wireless communication via the first wireless interface;
   a processor; and
   a memory storing computer-readable instructions therein, the computer-readable instructions, when executed by the processor, causing the communication device to:
      shift an operation state of the communication device from a child station state for operating as a child station of a first wireless network to a specific state different from the child station state, in a case where a first wireless connection with a second external device is established via the second wireless interface under a predetermined state,
         the predetermined state being a state where the communication device is participating, as the child station, in the first wireless network in which a first external device different from the second external device is a parent station, and
         the first wireless network being for executing a wireless communication via the first wireless interface;
      receive a request signal from the second external device via the first wireless interface after the operation state of the communication device has been shifted to the specific state, the request signal being for requesting the communication device to establish a wireless connection via the first wireless interface; and
      establish a second wireless connection with the second external device via the first wireless interface so as to belong to a second wireless network for executing a wireless communication via the first wireless interface, in a case where the request signal is received from the second external device.

2. The communication device as in claim 1, wherein the computer-readable instructions, when executed by the processor, further cause the communication device to:
   determine whether a wireless communication using the first wireless network is being executed in the case where the first wireless connection is established with the second external device under the predetermined state,
   wherein the operation state of the communication device is shifted from the child station state to the specific state in a case where it is determined that a wireless communication using the first wireless network is not being executed, and
   the operation state of the communication device is not shifted from the child station state to the specific state in a case where it is determined that a wireless communication using the first wireless network is being executed.

3. The communication device as in claim 1, wherein the computer-readable instructions, when executed by the processor, further cause the communication device to:
   determine whether a non-communication time is longer than a first predetermined time in the case where the first wireless connection is established with the second external device under the predetermined state, the non-communication time being a time that has elapsed since the communication device lastly completed a wireless communication using the first wireless network,
   wherein the operation state of the communication device is shifted from the child station state to the specific state in a case where it is determined that the non-communication time is longer than the first predetermined time, and
   the operation state of the communication device is not shifted from the child station state to the specific state in a case where it is determined that the non-communication time is less than or equal to the first predetermined time.

4. The communication device as in claim 1, wherein the computer-readable instructions, when executed by the processor, further cause the communication device to:
   determine whether the communication device is in a non-communication state in the case where the first wireless connection is established with the second external device under the predetermined state, the non-communication state being a state where the communication device has not yet executed a wireless communication using the first wireless network since the communication device participated in the first wireless network,
   wherein the operation state of the communication device is shifted from the child station state to the specific state in a case where it is determined that the communication device is not in the non-communication state, and
   the operation state of the communication device is not shifted from the child station state to the specific state in a case where it is determined that the communication device is in the non-communication state.

5. The communication device as in claim 1, wherein the computer-readable instructions, when executed by the processor, further cause the communication device to:
   determine whether the first external device that comprises a specific application is accessing to the communication device by using the specific application in the case where the first wireless connection is established with the second external device under the predetermined state,
   wherein the operation state of the communication device is shifted from the child station state to the specific state in a case where it is determined that the first external device is not accessing to the communication device, and
   the operation state of the communication device is not shifted from the child station state to the specific state in a case where it is determined that the first external device is accessing to the communication device.

6. The communication device as in claim 2, further comprising:
   a display,
   wherein the computer-readable instructions, when executed by the processor, further cause the communication device to:
      display, on the display, a predetermined screen indicating that it is impossible to establish a wireless connection via the first wireless interface between the communication device and the second external device in a case where the operation state of the communication device is not shifted from the child station state to the specific state even if the first wireless connection is established with the second external device under the predetermined state.

7. The communication device as in claim 1, wherein the computer-readable instructions, when executed by the processor, further cause the communication device to:
establish a third wireless connection with the first external device via the first wireless interface so as to participate again, as the child station, in the first wireless network in which the first external device is the parent station, in a case where the request signal is not received from the second external device even if a second predetermined time has elapsed since the operation state of the communication device was shifted from the child station state to the specific state.

8. The communication device as in claim 1, wherein in the second wireless network, the second external device is a parent station and the communication device is a child station.

9. The communication device as in claim 1, wherein
the specific state is a parent station state for operating as a parent station of the second wireless network, and
in the second wireless network, the communication device is the parent station and the second external device is a child station.

10. The communication device as in claim 1, wherein
the child station state is a state where a response signal for the request signal is not sent to the second external device, in the case where the request signal is received from the second external device, and
the specific state is a state where the response signal for the request signal is sent to the second external device, in the case where the request signal is received from the second external device.

11. The communication device as in claim 1, wherein
the child station state is a state where a communication for a trigger of sending the request signal to the communication device is not executed with the second external device,
the specific state is a state where the communication for the trigger of sending the request signal to the communication device is executed with the second external device.

12. The communication device as in claim 1, wherein the child station state is a client state of operating as a client of a WFD (abbreviation of Wi-Fi Direct (registered trademark)) scheme developed by Wi-Fi Alliance.

13. A non-transitory computer-readable recording medium storing computer-readable instructions for a communication device, wherein the computer-readable instructions, when executed by a processor of the communication device, cause the communication device to:
shift an operation state of the communication device from a child station state for operating as a child station of a first wireless network to a specific state different from the child station state, in a case where a first wireless connection with a second external device is established via a second wireless interface of the communication device under a predetermined state,
the predetermined state being a state where the communication device is participating, as the child station, in the first wireless network in which a first external device different from the second external device is a parent station,
the first wireless network being for executing a wireless communication via a first wireless interface of the communication device different from the second wireless interface, and
wherein a communication speed of a wireless communication via the second wireless interface is slower than a communication speed of a wireless communication via the first wireless interface;
receive a request signal from the second external device via the first wireless interface after the operation state of the communication device has been shifted to the specific state, the request signal being for requesting the communication device to establish a wireless connection via the first wireless interface; and
establish a second wireless connection with the second external device via the first wireless interface so as to belong to a second wireless network for executing a wireless communication via the first wireless interface, in a case where the request signal is received from the second external device.

14. A method executed by a communication device, the method comprising:
shifting an operation state of the communication device from a child station state for operating as a child station of a first wireless network to a specific state different from the child station state, in a case where a first wireless connection with a second external device is established via a second wireless interface of the communication device under a predetermined state,
the predetermined state being a state where the communication device is participating, as the child station, in the first wireless network in which a first external device different from the second external device is a parent station,
the first wireless network being for executing a wireless communication via a first wireless interface of the communication device different from the second wireless interface,
wherein a communication speed of a wireless communication via the second wireless interface is slower than a communication speed of a wireless communication via the first wireless interface;
receiving a request signal from the second external device via the first wireless interface after the operation state of the communication device has been shifted to the specific state, the request signal being for requesting the communication device to establish a wireless connection via the first wireless interface; and
establishing a second wireless connection with the second external device via the first wireless interface so as to belong to a second wireless network for executing a wireless communication via the first wireless interface, in a case where the request signal is received from the second external device.

* * * * *